(12) United States Patent
Wittkopp

(10) Patent No.: US 6,910,986 B2
(45) Date of Patent: Jun. 28, 2005

(54) SEVEN-SPEED TRANSMISSION

(75) Inventor: Scott H. Wittkopp, Ypsilanti, MI (US)

(73) Assignee: General Motors Corporation, Detroit, MI (US)

( * ) Notice: Subject to any disclaimer, the term of this patent is extended or adjusted under 35 U.S.C. 154(b) by 69 days.

(21) Appl. No.: 10/681,586

(22) Filed: Oct. 8, 2003

(65) Prior Publication Data

US 2005/0079945 A1   Apr. 14, 2005

(51) Int. Cl.[7] .............................................. F16H 3/62
(52) U.S. Cl. ...................................................... 475/275
(58) Field of Search ........................................ 475/275

(56) References Cited

U.S. PATENT DOCUMENTS

| | | | |
|---|---|---|---|
| 4,070,927 A | 1/1978 | Polak | 74/765 |
| 4,709,594 A | 12/1987 | Maeda | 74/753 |
| 5,106,352 A | 4/1992 | Lepelletier | 475/280 |
| 5,599,251 A | 2/1997 | Beim et al. | 475/275 |
| 6,053,839 A | 4/2000 | Baldwin et al. | 475/281 |
| 6,071,208 A | 6/2000 | Koivunen | 475/275 |
| 6,083,135 A | 7/2000 | Baldwin et al. | 475/276 |
| 6,773,370 B2 * | 8/2004 | Martyka et al. | 475/275 |

* cited by examiner

Primary Examiner—Dirk Wright
(74) Attorney, Agent, or Firm—Leslie C. Hodges

(57) ABSTRACT

A seven-speed transmission includes an input shaft, an output shaft, and a planetary gear arrangement having three planetary gear sets. The input shaft and output shaft are continuously connected with specific members of the gear sets. Three interconnecting members continuously connect specific members of the gear sets. Three brakes and three clutches are engageable in combinations of two to establish seven forward speed ratios and a reverse speed ratio between the input shaft and the output shaft.

6 Claims, 3 Drawing Sheets

GEARSETS (Tooth Counts or Ratios)

| | TEST | S | Ps | Pr | R |
|---|---|---|---|---|---|
| GS1 | Simple | 1 | 0.625 | | 2.25 |
| GS2 | Simple | 1 | 0.875 | | 2.75 |
| GS3 | Simple | 1 | 1.25 | | 3.5 |
| | | | | | |
| | | | | | |
| | | | | | |
| | | | | | |

FIG. 3a

| R/S Ratio | R1/S1 | R2/R3 | R3/R3 | | | |
|---|---|---|---|---|---|---|
| | 2.25 | 2.75 | 3.50 | | | |
| P/S Ratio | P1/S1 | P2/S2 | P3/S3 | | | |
| | 0.63 | 0.88 | 1.25 | | | |

FIG. 3b

FIXED CONNECTIONS

| | | |
|---|---|---|
| PC1 | R3 | |
| PC1 | Output | |
| PC2 | R1 | |
| PC3 | R2 | |
| Input | S2 | |
| | | |
| | | |
| | | |
| | | |
| | | |

FIG. 3c

CLUTCHING TABLE

| GEAR STATE | Gear Ratio | Ratio Step | CBR1 50 Clutch | CB257 52 Clutch | C3R 54 Clutch | C467 56 Clutch | CB1234 58 Clutch | C56 59 Clutch |
|---|---|---|---|---|---|---|---|---|
| | | | PC3 Ground | S3 Ground | Input S3 | Input PC3 | S1 Ground | Input S1 |
| Rev | -3.500 | | X | | | | | |
| N | | -0.65 | O | | G | | | |
| 1st | 5.417 | | X | | | | | |
| 2nd | 3.278 | 1.65 | | X | | | | |
| 3rd | 2.034 | 1.61 | | | X | | | |
| 4th | 1.444 | 1.41 | | | | | X | |
| 5th | 1.229 | 1.18 | | X | | | X | |
| 6th | 1.000 | 1.23 | | | | X | | X |
| 7th | 0.778 | 1.29 | | X | | X | | |
| 8th | | | | | | | | X |

*Overall Ratio:* 6.96

X -- On, carrying torque    G -- Garage-shift element, on and carrying torque
O -- On, NOT carrying torque    C -- On only for manual range Coast braking

FIG. 3d

SEVEN-SPEED TRANSMISSION

TECHNICAL FIELD

The present invention relates to a transmission having three planetary gear sets that are controlled by six torque transmitting devices to provide seven forward speed ratios and one reverse speed ratio.

BACKGROUND OF THE INVENTION

Passenger vehicles include a powertrain that is comprised of an engine, multi-speed transmission, and a differential or final drive. The multi-speed transmission increases the overall operating range of the vehicle by permitting the engine to operate through its torque range a number of times. The number of forward speed ratios that are available in the transmission determines the number of times the engine torque range is repeated. Early automatic transmissions had two speed ranges. This severely limited the overall speed range of the vehicle and therefore required a relatively large engine that could produce a wide speed and torque range. This resulted in the engine operating at a specific fuel consumption point during cruising, other than the most efficient point. Therefore, manually-shifted countershaft transmissions were the most popular.

With the advent of three- and four-speed automatic transmissions, the automatic shifting (planetary gear) transmission increased in popularity with the motoring public. These transmissions improved the operating performance and fuel economy of the vehicle. The increased number of speed ratios reduces the step size between ratios and therefore improves the shift quality of the transmission by making the ratio interchanges substantially imperceptible to the operator under normal vehicle acceleration.

It has been suggested that the number of forward speed ratios be increased to six or more. Six-speed transmissions are disclosed in U.S. Pat. Nos. 4,070,927 issued to Polak on Jan. 31, 1978; 6,071,208 issued to Koivunen on Jun. 6, 2000; 5,106,352 issued to Lepelletier on Apr. 21, 1992; and 5,599,251 issued to Beim and McCarrick on Feb. 4, 1997.

Six-speed transmissions offer several advantages over four- and five-speed transmissions, including improved vehicle acceleration and improved fuel economy. While many trucks employ power transmissions, such as Polak, having six or more forward gear ratios, passenger cars are still manufactured with three- and four-speed automatic transmissions and relatively few five or six-speed devices due to the size and complexity of these transmissions. The Polak transmission provides six forward speed ratios with three planetary gear sets, two clutches, and three brakes. The Koivunen and Beim patents utilize six torque-transmitting devices including four brakes and two clutches to establish six forward speed ratios and a reverse ratio. The Lepelletier patent employs three planetary gear sets, three clutches and two brakes to provide six forward speeds. One of the planetary gear sets is positioned and operated to establish two fixed speed input members for the remaining two planetary gear sets.

Seven-speed transmissions are disclosed in U.S. Pat. No. 4,709,594 to Maeda; U.S. Pat. No. 6,053,839 to Baldwin et al.; and U.S. Pat. No. 6,083,135 to Baldwin et al. Seven- and eight-speed transmissions provide further improvements in acceleration and fuel economy over six-speed transmissions. However, like the six-speed transmissions discussed above, the development of seven- and eight-speed transmissions has been precluded because of complexity, size and cost.

SUMMARY OF THE INVENTION

It has been surprisingly discovered that an existing General Motors Corporation/Ford Motor Company front wheel drive transmission, the "X22F," which is a six-speed transmission, can be converted to a seven-speed transmission by merely adding a single clutch. The resulting gear ratios and ratio steps for the reverse and seven forward speeds satisfy design criteria.

The seven-speed transmission includes an input shaft, an output shaft, and a planetary gear arrangement having first, second and third planetary gear sets, wherein each planetary gear set has a ring gear member, a sun gear member and a planet carrier assembly member. The input shaft is continuously connected with the sun gear member of the second planetary gear set, and the output shaft is continuously interconnected with the planet carrier assembly member of the third planetary gear set.

A first interconnecting member continuously connects the ring gear member of the first planetary gear set with the planet carrier assembly member of the third planetary gear set. A second interconnecting member continuously connects the planet carrier assembly member of the first planetary gear set with the ring gear member of the second planetary gear set. A third interconnecting member continuously connects the planet carrier assembly member of the second planetary gear set with the ring gear member of the third planetary gear set.

A first brake selectively connects the transmission housing with the planet carrier assembly member of the first planetary gear set. A second brake selectively connects the transmission housing with the sun gear member of the first planetary gear set. A third brake selectively connects the transmission housing with the sun gear member of the third planetary gear set.

A first clutch selectively connects the sun gear member of the first planetary gear set with the sun gear member of the second planetary gear set. A second clutch selectively connects the planet carrier assembly member of the first planetary gear set with the sun gear member of the second planetary gear set. A third clutch selectively connects the sun gear member of the second planetary gear set with the sun gear member of the third planetary gear set.

The first, second and third brakes and first, second and third clutches are engaged in combinations of two to establish seven forward speed ratios and a reverse speed ratio between the input shaft and the output shaft.

The above features and advantages, and other features and advantages of the present invention are readily apparent from the following detailed description of the best mode for carrying out the invention when taken in connection with the accompanying drawings.

BRIEF DESCRIPTION OF THE DRAWINGS

FIG. 3a shows a gear set tooth count table in accordance with the invention;

FIG. 3b shows a ring gear/sun gear ratio table in accordance with the invention;

FIG. 3c shows a fixed interconnection table in accordance with the invention; and FIG. 3d shows a truth table in accordance with the invention.

DESCRIPTION OF THE PREFERRED EMBODIMENT

Figure 1:
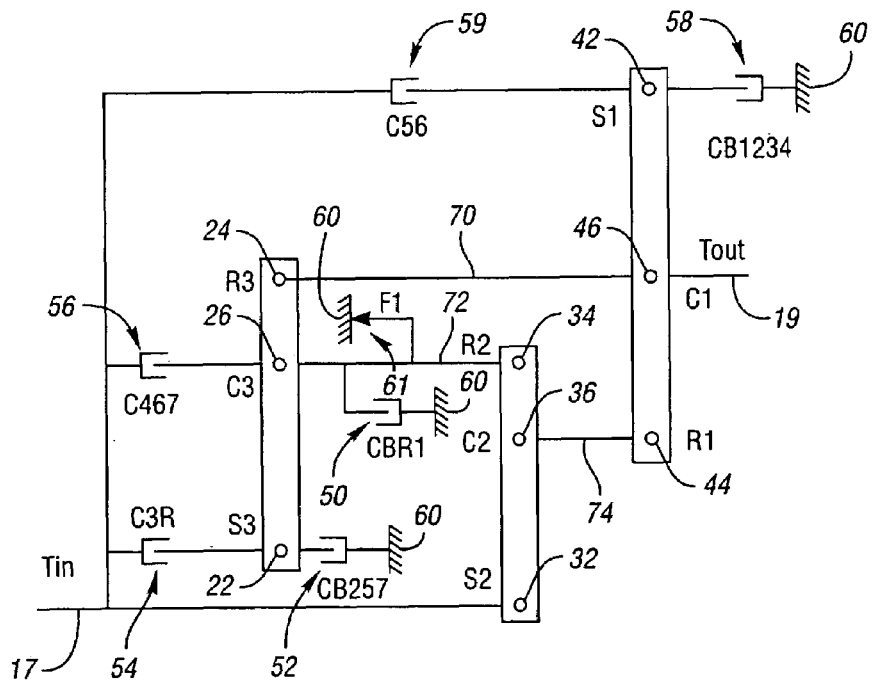
FIG. 1 shows a lever diagram of a transmission in accordance with the invention.
Figure 2:
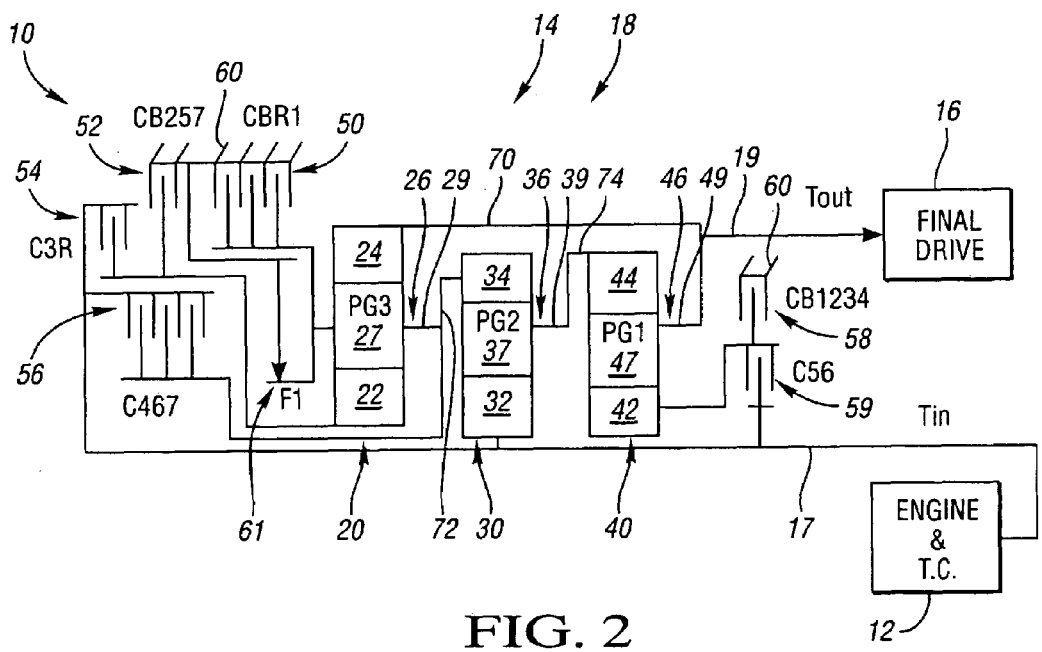
FIG. 2 shows a stick diagram corresponding with the lever diagram of FIG. 1.

Referring to FIG. 2, a stick diagram is shown for a transmission in accordance with the invention corresponding with the lever diagram of FIG. 1 and the various tables of FIGS. 3a–d. As shown in FIG. 2, a powertrain 10 includes a conventional engine and torque converter 12, a planetary transmission 14, and a conventional final drive mechanism 16.

The planetary transmission 14 includes a input shaft 17 continuously connected with the engine and torque converter 12, a planetary gear arrangement 18, and an output shaft 19 continuously connected with the final drive mechanism 16. The planetary gear arrangement 18 includes three planetary gear sets 20, 30 and 40, viewed from left to right in FIG. 2.

The planetary gear set 20 includes a sun gear member 22, a ring gear member 24, and a planet carrier assembly member 26. The planet carrier assembly member 26 includes a plurality of pinion gears 27 rotatably mounted on a carrier member 29 and disposed in meshing relationship with both the sun gear member 22 and the ring gear member 24.

The planetary gear set 30 includes a sun gear member 32, a ring gear member 34, and a planet carrier assembly member 36. The planet carrier assembly member 36 includes a plurality of pinion gears 37 rotatably mounted on a carrier member 39 and disposed in meshing relationship with both the sun gear member 32 and the ring gear member 34.

The planetary gear set 40 includes a sun gear member 42, a ring gear member 44, and a planet carrier assembly member 46. The planet carrier assembly member 46 includes a plurality of pinion gears 47 rotatably mounted on a carrier member 49 and disposed in meshing relationship with both the sun gear member 42 and the ring gear member 44.

The planetary gear arrangement 18 also includes six torque transmitting mechanisms 50, 52, 54, 56, 58, 59, with an optional free wheeler 61. The torque transmitting mechanisms 50, 52 and 58 are stationary type torque transmitting mechanisms, commonly termed brakes or reaction clutches. The torque transmitting mechanisms 54, 56 and 59 are rotating type torque transmitting mechanisms, commonly termed clutches.

The input shaft 17 is continuously connected with the sun gear member 32, and the output shaft 19 is continuously connected with the planet carrier assembly member 46. A first interconnecting member 70 continuously connects the ring gear member 24 with the planet carrier assembly member 46. A second interconnecting member 72 continuously connects the planet carrier assembly member 26 with the ring gear member 34. A third interconnecting member 74 continuously connects the planet carrier assembly member 36 with the ring gear member 44.

As referred to in the appended claims, the planetary gear set 20 is the first planetary gear set, the planetary gear set 30 is the second planetary gear set, and the planetary gear set 40 is the third planetary gear set. Also, the brake 50 is the first brake, the brake 52 is the second brake, and the brake 58 is the third brake. Further, the clutch 54 is the first clutch, the clutch 56 is the second clutch, and the clutch 59 is the third clutch.

The planet carrier assembly member 26 is selectively connectable with the transmission housing 60 through the brake 50. The sun gear member 22 is selectively connectable with the transmission housing 60 through the brake 52. The sun gear member 22 is selectively connectable with the sun gear member 32 through the clutch 54. The planet carrier assembly member 26 is selectively connectable with the sun gear member 32 through the clutch 56. The sun gear member 42 is selectively connectable with the transmission housing 60 through the brake 58. The sun gear member 32 is selectively connectable with the sun gear member 42 through the clutch 59.

As shown in the truth table of FIG. 3d, the torque transmitting mechanisms 50, 52, 54, 56, 58, 59 are selectively engaged in combinations of two to provide seven forward speed ratios and one reverse speed ratio. It should also be noted in the truth table that the brake 50 remains engaged through the neutral condition, thereby simplifying the forward/reverse interchange.

To establish the reverse speed ratio, the brake 50 and clutch 54 are engaged. The overall numerical value of the reverse speed ratio is −3.500, as indicated in the truth table of FIG. 3d.

The first forward speed ratio is established with the engagement of the brakes 50, 58. The overall numerical value of the first forward speed ratio is 5.417, as indicated in the truth table of FIG. 3d.

The second forward speed ratio is established with the engagement of the brakes 52, 58. The overall numerical value of the second forward speed ratio is 3.278, as indicated in the truth table of FIG. 3d.

The third forward speed ratio is established with the engagement of the clutch 54 and brake 58. The overall numerical value of the third forward speed ratio is 2.034, as indicated in the truth table of FIG. 3d.

The fourth forward speed ratio is established with the engagement of the clutch 56 and the brake 58. The overall numerical value of the fourth forward speed ratio is 1.444, as indicated in the truth table of FIG. 3d.

The fifth forward speed ratio is established with the engagement of the brake 52 and the clutch 59. The overall numerical value of the fifth forward speed ratio is 1.229, as indicated in the truth table of FIG. 3d.

The sixth forward speed ratio is established with the engagement of the clutches 56, 59. The overall numerical value of the sixth forward speed ratio is 1, as indicated in the truth table of FIG. 3d.

The seventh forward speed ratio is established with the engagement of the brake 52 and the clutch 56. The overall numerical value of the seventh forward speed ratio is 0.778, as indicated in the truth table of FIG. 3d.

As set forth above, the engagement schedules for the torque transmitting mechanisms are shown in the truth table of FIG. 3d. This table also provides an example of speed ratios that are available using the ring gear/sun gear tooth ratios given by way of example in the table of FIG. 3d. The R1/S1 value is the tooth ratio of the planetary gear set 40; the R2/S2 value is the tooth ratio of the planetary gear set 30; and the R3/S3 value is the tooth ratio of the planetary gear set 20. The truth table of FIG. 3d also describes the ratio steps that are attained utilizing the sample tooth ratios given. For example, the step ratio between the first and second forward ratios is 1.65, while the step ratio between the reverse and first forward ratio is −0.65. It can also be readily determined from the truth table of FIG. 3d that all of the single step forward ratio interchanges are of the single transition variety, except the four/five interchange.

It should be noted for packaging purposes that the added clutch 59 is positioned radially inward from the brake 58 to achieve the desired power flow. The clutch 59 has a housing which acts as a hub of the brake 58. The free wheeler 61 is optional.

The tables of FIGS. 3a–d reference various components, which are identified as follows: R1, R2, R3 are ring gear members 44, 34, 24, respectively. S1, S2, S3 are sun gear members 42, 32, 22, respectively. PC1, PC2, PC3 are planet carrier assembly members 46, 36, 26, respectively. GS1, GS2, GS3 are planetary gear sets 40, 30, 20, respectively. P1, P2, P3 are pinion gears 47, 37, 27, respectively.

While the best mode for carrying out the invention has been described in detail, those familiar with the art to which this invention relates will recognize various alternative designs and embodiments for practicing the invention within the scope of the appended claims.

What is claimed is:

1. A seven-speed transmission comprising:
   an input shaft;
   an output shaft;
   a planetary gear arrangement having first, second and third planetary gear sets, each planetary gear set having a ring gear member, sun gear member and planet carrier assembly member;
   said input shaft being continuously interconnected with said sun gear member of the second planetary gear set, said output shaft being continuously interconnected with said planet carrier assembly member of the third planetary gear set;
   a first interconnecting member continuously connecting said ring gear member of said first planetary gear set with said planet carrier assembly member of said third planetary gear set;
   a second interconnecting member continuously connecting said planet carrier assembly member of said first planetary gear set with said ring gear member of said second planetary gear set;
   a third interconnecting member continuously connecting said planet carrier assembly member of said second planetary gear set with said ring gear member of said third planetary gear set;
   a first brake selectively interconnecting a transmission housing with said planet carrier assembly member of the first planetary gear set;
   a second brake selectively interconnecting said transmission housing with said sun gear member of the first planetary gear set;
   a third brake selectively interconnecting said transmission housing with said sun gear member of the third planetary gear set;
   a first clutch selectively interconnecting said sun gear member of the first planetary gear set with said sun gear member of the second planetary gear set;
   a second clutch selectively interconnecting said planet carrier assembly member of the first planetary gear set with said sun gear member of the second planetary gear set;
   a third clutch selectively interconnecting said sun gear member of the second planetary gear set with said sun gear member of the third planetary gear set; and
   said first, second and third brakes, and first, second and third clutches being engaged in combinations of two to establish seven forward speed ratios and a reverse speed ratio between said input shaft and said output shaft.

2. The seven-speed transmission of claim 1, wherein said first, second and third planetary gear sets are simple planetary gear sets.

3. The seven-speed transmission of claim 1, wherein said third clutch is positioned radially inward from said third brake.

4. The seven-speed transmission of claim 1, wherein ratio steps for sequential shift changes between first and seventh speeds are each between approximately 1.1 and 1.7.

5. The seven-speed transmission of claim 1, wherein a seventh of said seven forward speed ratios is an overdrive ratio.

6. A seven-speed transmission comprising:
   an input shaft;
   an output shaft;
   a planetary gear arrangement having first, second and third planetary gear sets, each planetary gear set having a ring gear member, sun gear member and planet carrier assembly member;
   said input shaft being continuously interconnected with said sun gear member of the second planetary gear set, said output shaft being continuously interconnected with said planet carrier assembly member of the third planetary gear set;
   a first interconnecting member continuously connecting said ring gear member of said first planetary gear set with said planet carrier assembly member of said third planetary gear set;
   a second interconnecting member continuously connecting said planet carrier assembly member of said first planetary gear set with said ring gear member of said second planetary gear set;
   a third interconnecting member continuously connecting said planet carrier assembly member of said second planetary gear set with said ring gear member of said third planetary gear set;
   a first brake selectively interconnecting a transmission housing with said planet carrier assembly member of the first planetary gear set;
   a second brake selectively interconnecting said transmission housing with said sun gear member of the first planetary gear set;
   a third brake selectively interconnecting said transmission housing with said sun gear member of the third planetary gear set;
   a first clutch selectively interconnecting said sun gear member of the first planetary gear set with said sun gear member of the second planetary gear set;
   a second clutch selectively interconnecting said planet carrier assembly member of the first planetary gear set with said sun gear member of the second planetary gear set;
   a third clutch selectively interconnecting said sun gear member of the second planetary gear set with said sun gear member of the third planetary gear set;
   said first, second and third brakes, and first, second and third clutches being engaged in combinations of two to establish seven forward speed ratios and a reverse speed ratio between said input shaft and said output shaft;
   wherein said third clutch is positioned radially inward from said third brake; and
   wherein ratio steps for sequential shift changes between first and seventh speeds are each between approximately 1.1 and 1.7.

* * * * *